(12) United States Patent
Chin et al.

(10) Patent No.: US 7,673,135 B2
(45) Date of Patent: Mar. 2, 2010

(54) REQUEST AUTHENTICATION TOKEN

(75) Inventors: Andy Chin, Sunnyvale, CA (US); Alina Vikutan, Sunnyvale, CA (US); Johnny C. Liu, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/297,285

(22) Filed: Dec. 8, 2005

(65) Prior Publication Data

US 2007/0136794 A1 Jun. 14, 2007

(51) Int. Cl.
*H04L 29/06* (2006.01)
*H04L 9/32* (2006.01)
*G06F 21/00* (2006.01)
*G06F 7/04* (2006.01)

(52) U.S. Cl. .................. 713/159; 713/161; 713/176; 713/185; 726/9; 726/10; 726/20

(58) Field of Classification Search .................. 713/159, 713/172, 185, 161, 176; 726/5, 9, 10, 20
See application file for complete search history.

(56) References Cited

U.S. PATENT DOCUMENTS 5,907,621 A * 5/1999 Bachman et al. ............ 713/155
6,360,254 B1 * 3/2002 Linden et al. ............... 709/219
6,393,468 B1 * 5/2002 McGee ....................... 709/218
7,222,363 B2 * 5/2007 Rice et al. ...................... 726/5
2006/0020684 A1 * 1/2006 Mukherjee et al. .......... 709/219

* cited by examiner

*Primary Examiner*—Nasser G Moazzami
*Assistant Examiner*—Mohammad W Reza
(74) *Attorney, Agent, or Firm*—Vierra Magen Marcus & DeNiro LLP (57) ABSTRACT

An authentication mechanism for use in network-based services generates an authentication token. The authentication token is provided to a client device as part of the code comprising a content page. The content page code is received and loaded by a browser application at the client device. When the content page code is received and loaded by the browser application, the authentication token is loaded by the browser as well. Upon receiving subsequent input, the browser application may send a content request to the server. The content request includes the authentication token maintained by the browser application in the content page. A server may validate the authentication token provided in the request using version information and one or more master authentication tokens.

17 Claims, 8 Drawing Sheets

REQUEST AUTHENTICATION TOKEN

BACKGROUND

Many web services provided over the Internet require a user to set up an account in order to fully utilize the web service. Users usually provide personal information to set up these web service accounts. To protect a user's personal information and use of the web service, most services institute security measures to prevent unauthorized access to a user's account.

Web services provide security in different ways to protect user information and use of their accounts. Some web service web sites provide user authentication by storing authentication information in a separate browser cookie file on the hard drive of a client device. In cookie-based authentication web services, the authentication information is accessed from one or more cookies at the client and sent to the web service whenever a request is made to the web service. The server receives the request, analyzes the authentication information and provides a response. If the authentication information retrieved from the cookie is validated (for example, the cookie authentication information matches server generated authentication information), a server generated response will include the requested content. If the authentication information is not validated by the server, the requested content is not provided.

Cookie-based authentication does not always protect the security of a user making a request. In some cases, an "attack" may use the authentication cookies to make a request on behalf of a user without the user's consent. For example, a user may receive an email through a web-based email service. The received email may contain an attachment. The attachment may include JavaScript code inserted by an attacker. When the user accesses her account and opens the email attachment through a browser application, the application may automatically execute the JavaScript. Execution of the JavaScript code may cause a message to be sent on behalf of the user. Thus, an attacker may send an email having an attachment to a user. When executed, the attachment sends an email that appears to be from the user's email account. This may allow attackers to send email, such as spam, to recipients from an email account other than their own.

In another case, two or more users at separate computing machines may communicate over a network from behind a proxy server. The proxy server may mistakenly provide personal data for one user to another user. For this to occur, a first user sends a request to a server through the proxy. The request may be associated with user account information associated with a service provided by the server. For example, the first user may request to see an email inbox content page for his email service account. The proxy may send the request, retrieve the response, cache the response, and provide the response to the first user. Subsequently, a second user may make the same request to the server, but for his own account information. After receiving the second user's request, the proxy may recognize that data associated with the request is currently cached (actually, the first user's data is cached). In response, rather than send the request to the server, the proxy may access the cached data (associated with the first user) and provide the data to the second user. Thus, data associated with the first user is provided to the second user by the proxy.

Previous web service security mechanisms have weaknesses in protecting user information and use of a web service. It is valuable for a network service to identify whether requests are initiated by their owner and provide accurate data to a user whom requests content.

SUMMARY

The technology herein, roughly described, pertains to an authentication mechanism for use in network-based services. A network server generates an authentication token and provides the token to a client device. The authentication token may be provided by the server as part of the code comprising a content page. A browser application at a client device receives and loads the authentication token as part of the content page code, rather than storing the token in a separate cookie file. Upon receiving subsequent input, the browser application may send a content request to the server. The content request includes the authentication token contained in the content page code. The server receives the content request, determines whether the token is valid, and processes the request accordingly The authentication token is included in content page code provided in a content response. When the content page code is received and loaded by the browser application, the authentication token is loaded by the browser as well. Thus, the authentication token is maintained in the code of the content page rather than stored as a file. Once the content page and token are loaded, the browser application may generate a content request in response to receiving further user input. The browser application then includes the authentication token from the content page code in the subsequent content request.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Content requests to a server are authenticated for a network service. A network server generates an authentication token. The token may be generated by the server in response to a request from a client device (for example, a login request). After generating the authentication token, the network server provides the token to the client device. The response to the content request is received and loaded by a browser application at the client device. Upon receiving subsequent input, the browser application may send a new content request to the server. The content request includes the authentication token maintained by the browser application. The server receives the request having the authentication token and determines if the authentication token is valid. In one embodiment, a master authentication token is compared to the received authentication token. If the received token is valid, a response with the requested token is generated and sent to the client. If the authentication token is not valid, the requested content is not provided to the client.

In one embodiment, the authentication token is included in content page code contained in the response to the client. When the content page code is received and loaded by the browser application, the authentication token is loaded by the browser as part of the content page. Thus, the authentication token can be maintained in the code of the content page provided by the browser application. Once the content page is loaded, the browser application may generate a content request in response to receiving user input. In this case, the browser application includes the authentication token from the content page code in subsequent content requests to a server.

The authentication token may be provided by the client device to a network server in one or more of several transport mechanisms. In one embodiment, the authentication token may be included in a request as a parameter in a requested URL. In this case, the content request may be sent in response to selection of a hyperlink or other content page element associated with an anchor. The content page code may include code that configures the URL request to include the authentication token as a parameter. In another embodiment, the authentication token may be included in the response as a form request. The form request may be generated in response to a form post input received by a user. Form post inputs may include user selection of a button, text box entry, or other input of an element not associated with an anchor. In any case, the content page code may include the authentication token as a parameter in the post form.

In one embodiment, authentication tokens may include version information. Version information may be used to identify tokens associated with different information or different periods of time. For example, authentication tokens may be generated from a hash of an authentication string and other information. The authentication string may change every twenty-four hours, forty-eight hours or some other time period. As a result, authentication tokens for users will change over time as the authentication string changes. In this case, the version information associated with an authentication token may be associated with different authentication strings. When a network server is authenticating a request from a client device, it may use the version information to determine what type of master authentication token to compare the request authentication token to (for example, a master authentication token generated using the appropriate authentication string). Processing of authentication tokens is discussed in more detail below.

Figure 1:
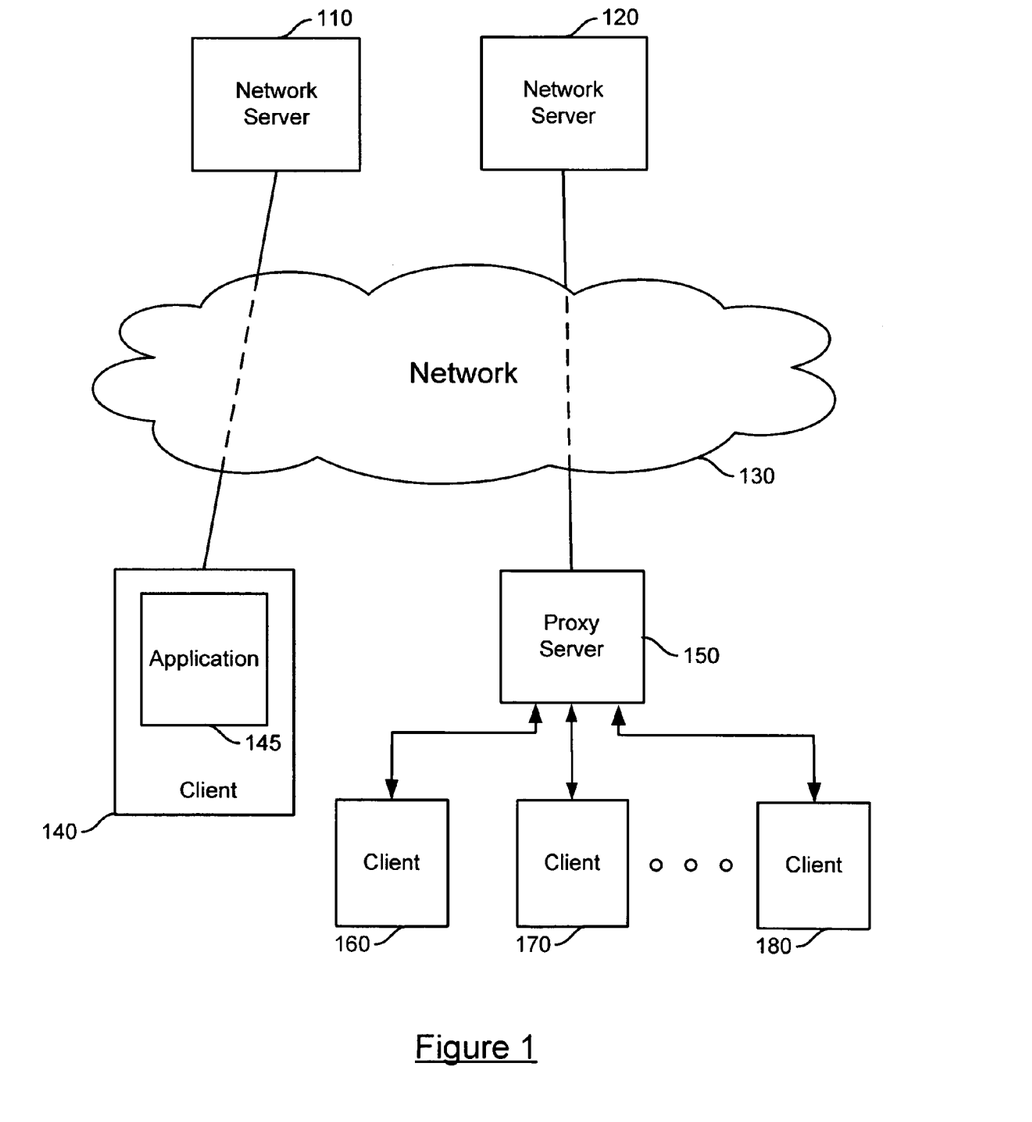
FIG. 1 is an embodiment of a system for authenticating a request.

FIG. 1 illustrates a system for authenticating a request sent from a client device to a network server. The system of FIG. 1 includes network servers 110-120, network 130, client 140, proxy 150 and clients 160-180. Network servers 110-120 communicate with client 140 and proxy 150 over network 130. In one embodiment, network 130 may be implemented as the Internet.

Network server 110 (which may be one or more servers or database systems) may provide a web service over network 130. For example, network server 110 may provide an email service administered by an electronic mail service provider. While providing the web service to a user at client device 140, network server 110 may receive a request from client device 140. In response to the request, network server 110 may authenticate the request, generate a response and send the response to client device 140. Authentication of the request may include confirming the validity of an authentication token included in the request. If the authentication token is determined to be valid, network server 110 can provide a response to a request. In one embodiment, the response may include a new authentication token.

In some embodiments, the web service provided by network server 110 may require a user to login before using the service. In this case, network server 110 may generate an authentication token in response to the user login. The authentication token may be generated using data provided by the requesting client, data maintained by the server and other information. Operation of network server 110 is discussed in more detail below.

Client device 140 can send and receive messages from network server 110 over network 130 and may include application 145. In some embodiments, client device 140 may have more than one application residing on the client. Application 145 may be a browser application, an instant messaging application or some other application. When network 130 is the Internet, application 145 may be a web browser. Application 145 may initiate content requests to network server 110 in response to receiving user input and provide content from a corresponding content response in a user interface. In this case, when client 140 receives a message (for example, a content response) from network server 110, application 145 may provide a content page from code in the response.

Network server 120 may provide a web service over network 130 as discussed above with respect to network server 110. Similar to network server 110, network server 120 may also generate and validate authentication tokens as well as respond to a request originating from a client device. In particular, network server 120 may send and receive messages with clients 160-180 through proxy 150.

Proxy 150 may send and receive messages with clients 160-180 and network server 120. In particular, clients 160-180 may send messages to network server 120 through proxy 150, and network server 130 may send messages to clients 160-180 through proxy 150. In either case, proxy 150 will receive the message and forward the message to the intended destination. For example, a request by client 160 for network server 120 is sent to proxy 150. Proxy 150 then sends a request to network server 120 on behalf of the request received from client 160. When proxy 150 receives a response from network server 120, the response is sent to client 160 by proxy 150.

Clients 160-180 may send and receive messages with network server 120 over network 130 through proxy 150. Operation of clients 160-180 is similar to that of client 140, except that communications are intercepted by proxy server 150. Clients 160-180 have one or more applications similar to application 145 illustrated in client 140 (not pictured in FIG. 1).

Figure 2:
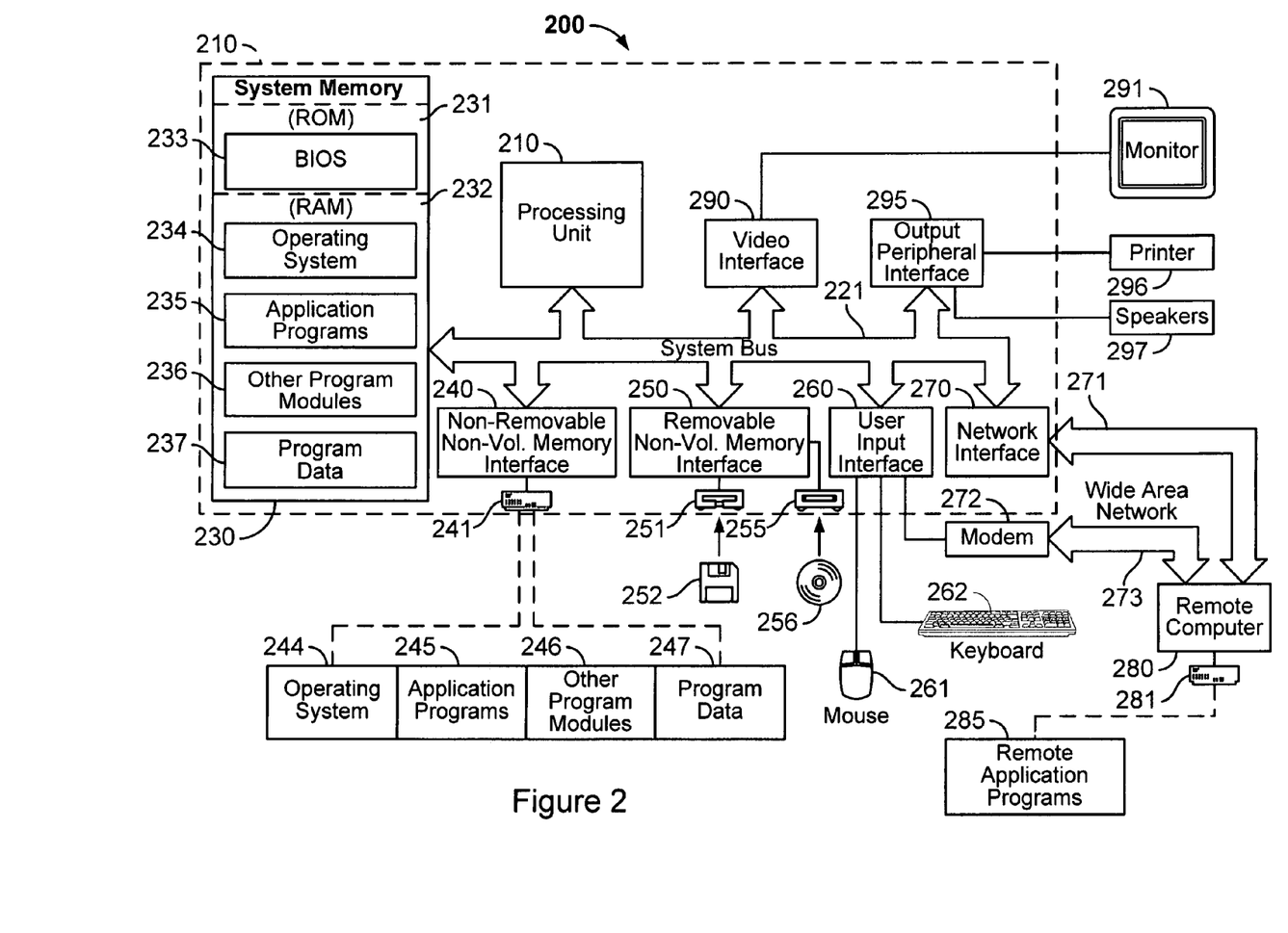
FIG. 2 is an embodiment of a computing environment for implementing the present technology.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200. In one embodiment, the computing environment of FIG. 2 may be used to implement network servers 110-120, clients 140 and 160-180 and proxy 150.

The present technology is operational with numerous other general purpose or special purpose computing system environments or configurations. Examples of well known computing systems, environments, and/or configurations that may be suitable for use with the present technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc. that perform particular tasks or implement particular abstract data types. The present technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or present technology for storage of information such as computer readable instructions, data structures, program modules or other data. Computer storage media includes, but is not limited to, RAM, ROM, EEPROM, flash memory or other memory present technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

FIGS. 3-7 discuss the present technology with respect to network serve 110 and client 140. However, the communications described below between network server 110 and client 140 may also be performed by network server 120 and any of clients 160-180 through proxy server 150.

Figure 3:
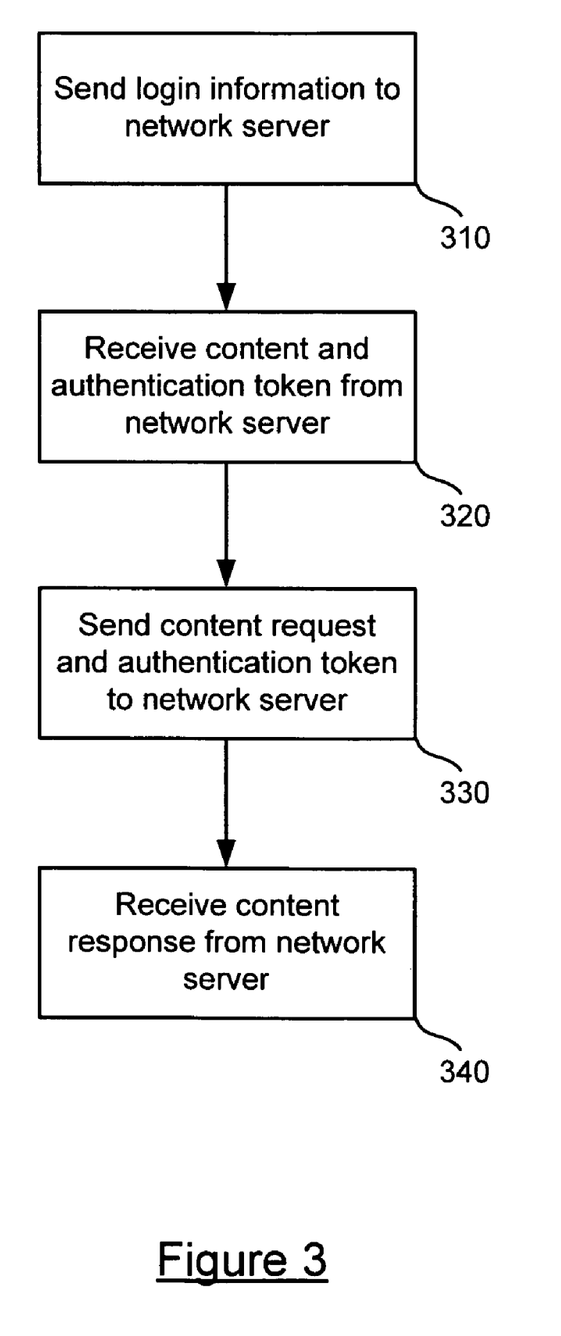
FIG. 3 is a flowchart of an embodiment of a process for retrieving an authentication token from a server.

FIG. 3 illustrates a flowchart of an embodiment for retrieving an authentication token by a client device from a server. In one embodiment, the flowchart of FIG. 3 may be associated with retrieving an authentication token from server 110 by client 140. Login information is sent to network server 110 by client 310 at step 310. In one embodiment, the login information may be received from a user through an interface provided by application 145. The login information may include user identification information, a user password or other information. In one embodiment, other information is sent to network server 110 to allow a user to access a service provided by the server. Next, client 140 may receive content and an authentication token from network server 110 at step 320. The content and authentication token are received in response to the login information sent at step 310 above. Processing of a login request (including generation of an authentication token) by a network server is discussed below with respect to FIG. 4. In one embodiment, the authentication token received from network server 110 is embedded within code comprising a content page. After receiving the content, application 145 provides the content to a user through a user interface. In one embodiment, the content page code of the response is loaded by a browser application such as application 145. After loading the content, the browser application provides the content to a user through an interface.

A content request containing an authentication token is sent to network server 110 at step 330. The content request may be sent in response to receiving input from a user through the interface provided by application 145. The request may include an authentication token embedded within the request. The authentication token is inserted into the request by application 145. In one embodiment, the authentication token may be inserted into the requested URL provided to network server 110. In this case, the authentication token may be presented as a parameter in an authentication required URL link. For example, the authentication token may exist in a URL as "host.com/ . . . &a={token string}. In this case, "host.com" is the domain name and "{token string}" includes a string comprising the authentication token. In other embodiments, the authentication token may be provided as part of a form associated with a post request. In this case, the authentication token is provided in the form associated with the standard post request format. For example, the authentication token may exist in a form as <input type="hidden"; name="a"; value="{token value}">. In this case, the type is "hidden" (indicating the authentication token is not displayed in the content page) and the string "{token value}" is the authentication token.

Next, a content response is received from network server 110 at step 340. The content response is received in response to the request sent above at step 330. Processing of a content request to generate a content response by a network server 110 is discussed in more detail below with respect to FIG. 6. The content response from network server 110 may include a new authentication token. The new authentication token may be generated from new information. The new information may include an updated time stamp, an updated unique authentication string or some other updated information.

Figure 4:
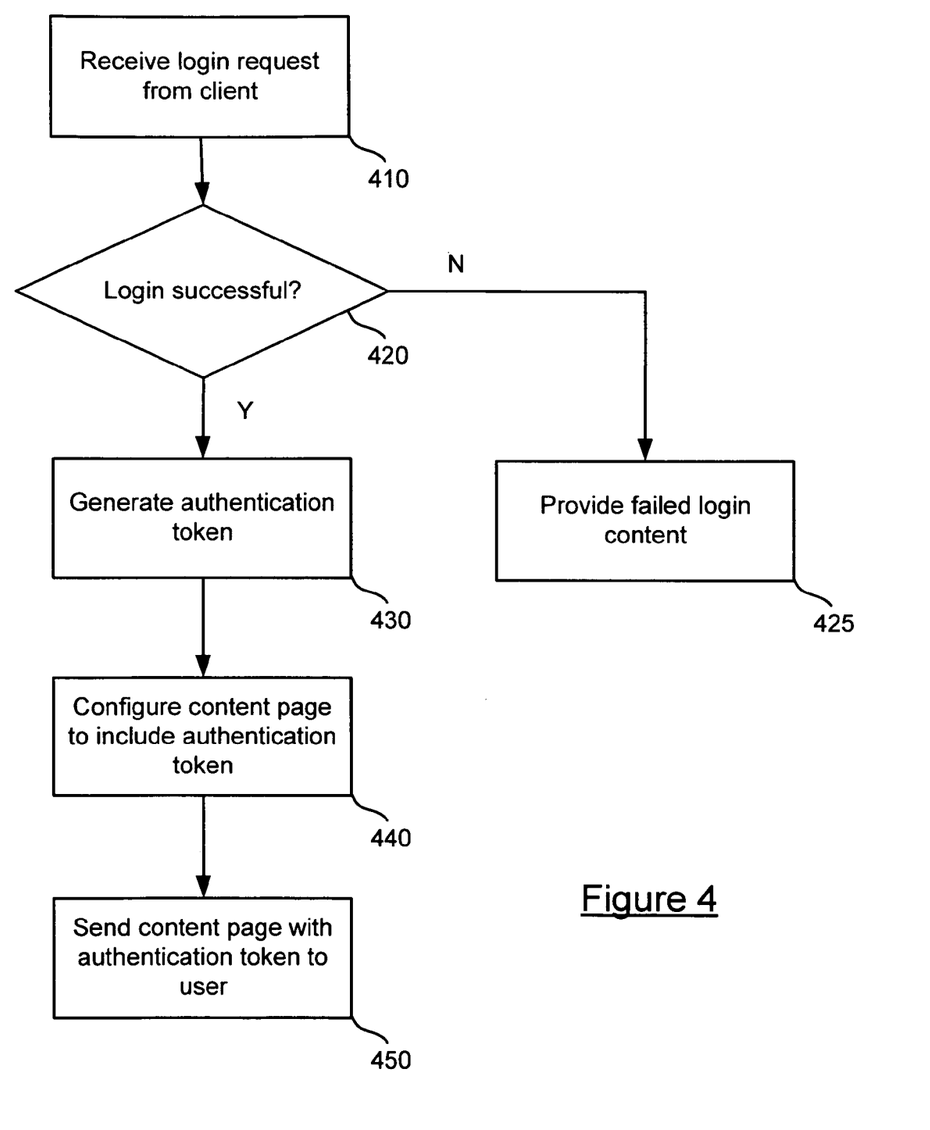
FIG. 4 is a flowchart of an embodiment of a process for providing an authentication token.

FIG. 4 is a flowchart of an embodiment for providing an authentication token by a server. In one embodiment, the flowchart of FIG. 4 can be performed by network server 110 between steps 310 and 320 of the flowchart of FIG. 3. First, a login request is received from client 140 at step 410. The login request may include a user name and password for the user that initiated the request. Next, a determination is made at step 420 as to whether a user login is successful at step 420. The login may be successful if the received user name and password match a stored user name and password. If the login is not successful, content associated with a failed login is provided in response to the login request at step 425. If the login is successful, an authentication token is generated at step 430. The authentication token may be generated using information received from the user, information stored on the network server and other information. Generation of an authentication token is discussed in more detail below with respect to FIG. 5.

Next, a content page is configured to include the generated authentication token at step 440. In one embodiment, the token is included in the content page code such that the token is submitted in subsequent content requests. For example, in response to a user selection of a hyperlink, a URL associated with the hyperlink may include the authentication token. The URL with the token is part of the content page code. In other instances, a user may provide input which causes a post request (such as providing input into a text box or selecting a button). In this case, the post request includes the authentication token in the message body of the request. Generation of the post request with the token is performed by the content page code. Since the authentication token is provided as a URL or form-post, it will not need to be accessed from a cookie file or other file by application 145 sending the request. Rather, the authentication token will be provided in a content response automatically by the content page code. Next, the content page having the authentication token is sent as a content response to a user at step 450. The content page and authentication token are sent as part of a content response from network server 110 to client 140.

Figure 5:
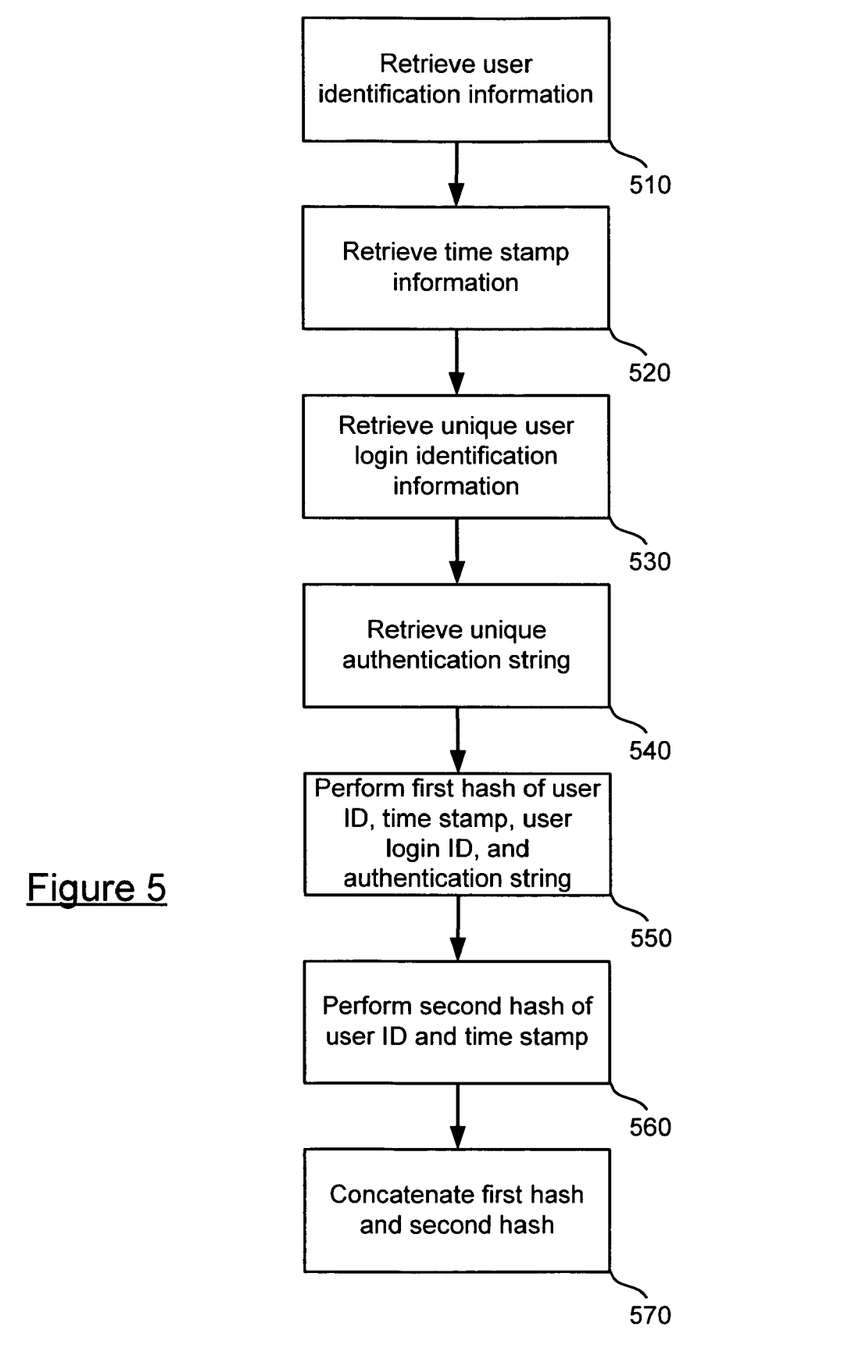
FIG. 5 is a flowchart of an embodiment of a process for generating an authentication token.

FIG. 5 is a flowchart of an embodiment for generating an authentication token by a server. In one embodiment, the flowchart of FIG. 5 provides more detail for step 430 in the flowchart of FIG. 4. User identification information is retrieved at step 510. In one embodiment, the user identification information may include a user email or some other character string associated with the user. The user information may be retrieved from a login request, content request, a database or some other source. Next, time stamp information is retrieved at step 520. The time stamp information is generated by network server 110 in response to receiving a content request from client device 140. In one embodiment, the time stamp information is the EPOCH time associated with the time that the user password was received by network server 110 from client device 140. In other embodiments, the time stamp may be generated in some other manner by network server 110. A unique user login identifier is retrieved at step 530. In one embodiment, in response to a successful login, a user is assigned a login identifier. The user login identifier may be associated with the user's session and is valid for the length of the session. Next, a unique authentication string is retrieved at step 540. In one embodiment, the unique authentication string is maintained by network server 110. In this case, the authentication string is not known to the user or any other server.

After retrieving the appropriate information, a first hash of the information is performed at step 550. In one embodiment, the first hash may be performed using the user identification, time stamp, user login identifier and authentication string. The first hash generates a unique value that is specific to a user. In one embodiment, the first hash may be performed using a one-way MD5 hash. This one-way MD5 hash may generate a thirty-two character hex value string. Other hash and encryption methods may be used as well. Next, a second hash is performed for user identification information and time stamp information at step 560. In one embodiment, the second hash may also be a thirty-two character hex string generated by a one-way MD5 hash or some other encryption method. Next, the first hash and second hash are concatenated at step 570. Concatenating the first hash and second hash may include stringing the results of the first hash and second hash together to form one string of characters.

In one embodiment, the string generated by the first hash may be used to prevent an attack associated with executable code placed in an attachment sent to a user. For example, all or a portion of an authentication token may be analyzed by a network server processing a content request. In one embodiment, only the portion of the authentication token generated by the first hash is analyzed by a network server. The token will only be included with the request if the request is sent in response to user input from an appropriate content page. If the request is sent by a browser application which executes code contained in an opened attachment, the authentication code is not included in the request. When the authentication token is not included in the request, the network server will ignore the request and/or process the request as a failed request.

The string generated by the second hash may be used to prevent a proxy server mistake due to caching. In particular, a proxy server may confirm that all or a designated part of an authentication token is included as part of a content request from a user. In one embodiment, only the portion of the authentication token generated by the second hash is analyzed by a proxy server. If the authentication token is not properly provided in the request, the proxy server will not forward the request to a content server on behalf of the requesting client device.

Figure 6:
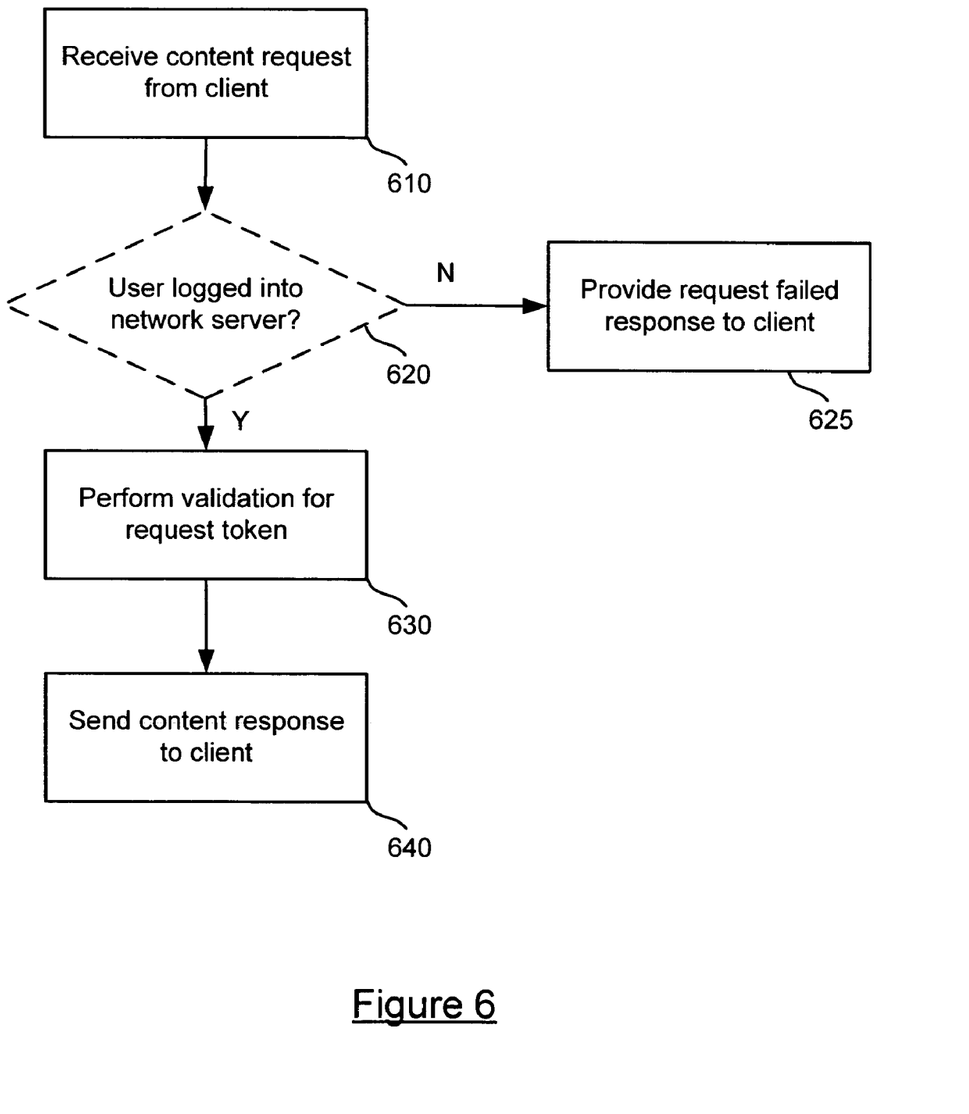
FIG. 6 is a flowchart of an embodiment of a process for processing a request.

FIG. 6 is a flowchart of an embodiment for processing a request by a server. In one embodiment, the flowchart of FIG. 6 may be performed by network server 110 after receiving a request from client 140 (such as the request sent at step 330 of the flowchart of FIG. 3). The content request is received from a client at step 610. In one embodiment, a determination is then made as to whether a user is logged into the network server receiving the request at step 620. As indicated by the dashed lines comprising the box of step 620, this step is optional. In one embodiment, the user is logged in if the content request includes a user login identifier. The user login identifier can be provided to the user at the time of login. In another embodiment, the user is logged into a network server if a user name associated with the request has a logged-in status as maintained by the network server. In this case, the login status of network service users may be stored as a flags or registers which are accessible to network server 110. If the user is logged into the network server receiving the request, the flowchart of FIG. 6 continues to step 630. If the user is not logged into the server receiving the request, a "request failed" response is sent to the client in response to the request at step 625.

Validation for the request token is performed at step 630. Validating the request token includes determining whether the request authentication token and a master authentication token match. The request authentication token is received in the content request from the client at step 610. A master authentication token can be maintained by the network server receiving the request. In some embodiments, the master authentication token is generated from the same information as the authentication token provided to a user at step 330 of FIG. 3. The master authentication token may be stored when the user authentication token is created or generated at a later time. Validating a request token is discussed in more detail below with respect to the flowchart of FIG. 7.

A content response is transmitted to the client at step 640. The content response may include a new authentication token depending on the results of the validation at step 630. The new authentication token may be associated with updated time stamp information, updated authentication version information or other updated information.

Figure 7:
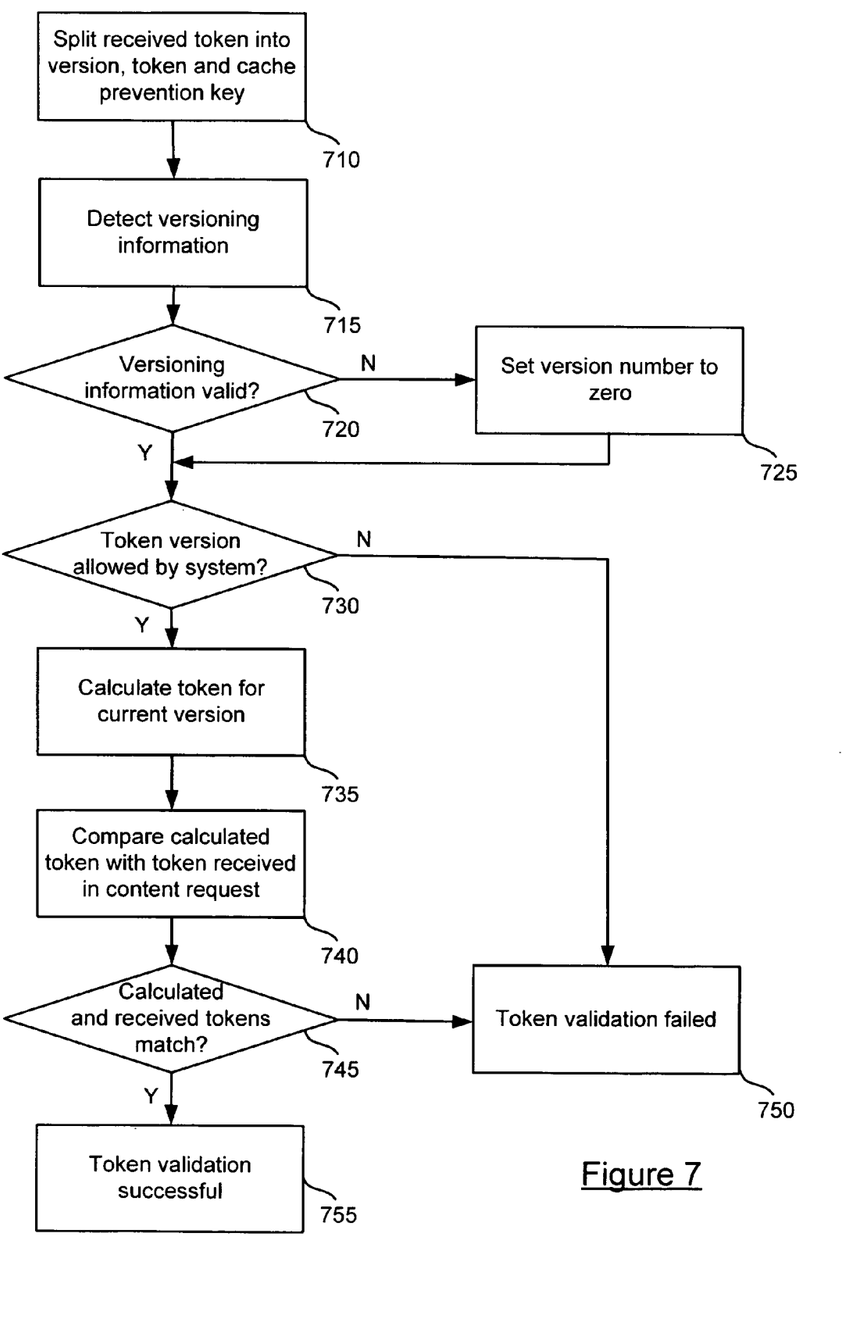
FIG. 7 illustrates a flowchart of an embodiment of a process for validating a request token.

FIG. 7 illustrates a flowchart of an embodiment of a process for validating a request token. The flowchart of FIG. 7 provides more detail for step 630 of FIG. 6. A request authentication token is split into version information, a token and a cache prevention key at step 710. The version information may be separated from the token and cache prevention key using a version indicator. A version indicator may be some character that indicates the authentication token is versioned. For example, a token may be represented as "2!7abcd2345." In this case, "2" is the version number, the exclamation mark "!" is the version indicator and "7abcd2345" is the token string. In some embodiments, the version indicator can be some other character and/or exist someplace else in the authentication token. In another embodiment, version information can be provided separately from the authentication string. Once the version information is separated, the token may be identified as a number of characters within the token string. For example, the token may be the first thirty-two characters in a token string, and the cache prevention key may be the second thirty-two characters in the string.

The retrieved token version information is detected at step 715. In one embodiment, the token version information may be a numerical character or some other character which may indicate a token version. Next, a determination is made as to whether the version information is valid at step 720. The determination may include comparing the retrieved version information with one or more known valid versions. In another embodiment, the determination may include detecting if the version information is in the proper format (for example, if the version information is in the form of a number). If the version information is determined to be valid, the flowchart continues to step 730. If the version information is not valid, the flowchart continues to step 725. The version number for the received token is set to zero at step 725. The version is to zero in response to detecting no valid version information at step 720. The flowchart then continues to step 730.

A determination is made as to whether the version associated with the request token version is allowed by the system at step 730. In one embodiment, the network server processing the request can maintain a list of allowed versions. The allowed versions may change over time as discussed above. If the detected version is allowed by the system, the flowchart continues to step 735. If the detected version is not allowed, the flowchart continues to step 750.

A token is calculated for the current version at step 735. In some embodiments, a token is calculated for each version that is currently acceptable by the system. Thus, if versions two through four of a token are currently acceptable, a token is generated using information associated with each version. The token may be calculated in the same manner that tokens are calculated for a client. Generation of tokens is discussed in more detail above with respect to the flowchart of FIG. 5.

Next, the newly calculated token (or master token) is compared to the request token received in the content request at step 740. The comparison may include comparing the token string of the request token to the token string of the master token to determine if they are the same. In some embodiments wherein network server 110 is performing the comparison, the server may compare the token string portion generated by the first hash (in some cases, the first thirty-two characters of a sixty-four character token string). In some embodiments, wherein proxy server 150 is performing the comparison, the proxy may compare the token string portion (or cache prevention key) generated by the second hash (in some cases, the second thirty-two characters of a sixty-four character token string).

A determination is then made by the server as to whether the request token and calculated token match at step 745. If the tokens do not match, the flowchart continues to step 750 where the token validation is determined to have failed. If the request token and the calculated token do match, then the flowchart of FIG. 7 ends at step 755 where the token validation is determined to have been successful.

Figure 8:
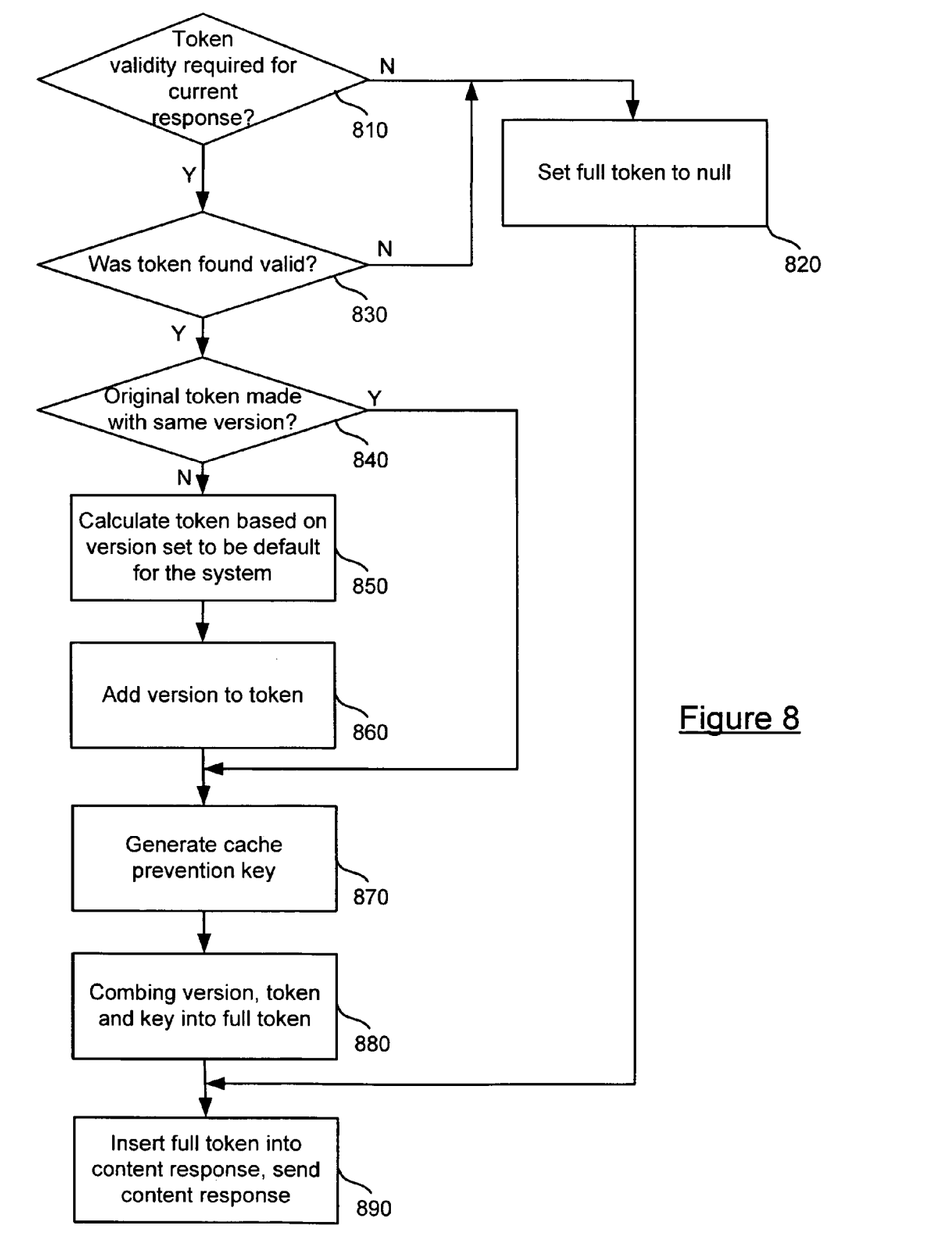
FIG. 8 illustrates a flowchart of an embodiment of a process for sending a response to a client device.

After validating a request token, a content response is generated and sent to a client device in response to the request. FIG. 8 is a flowchart of an embodiment of a process for generating and sending a content response. In one embodiment, FIG. 8 provides more detail for step 640 of FIG. 6. A determination is made as to whether token validity is required for the current content response at step 810. Some content requests may require a valid token to provide requested content, while other requests may not require a token. In one embodiment, the determination is made for the request received at step 610 of FIG. 6 and the token processed with respect to FIG. 7. If token validity is required for the response, the flowchart continues to step 830. If token validity is not required for the current response, the flowchart continues to step 820. At step 820, the response full token is set to null. In this case, the updated authentication token sent in the content request is one that will not be validated upon subsequent requests to the server. The flowchart then continues to step 890.

A determination is made as to whether the received token was found valid at step 830. In one embodiment, the determination recalls the outcome of the determination made at step 745 of the flowchart of FIG. 7. If the token was not found valid, the flowchart of FIG. 8 continues to step 820. If the token is found valid, the flowchart continues to step 840. A determination is made as to whether the original token was made with the same version as the current version at step 840.

If the received token was made with the same version as the calculated token, the flowchart continues to step 870. In this case, the version and token of the full token are used in a subsequent token provided to the client in the content response. If the received token has a version that differs from the calculated token, the flowchart continues to step 850.

A token is calculated based on the current default version at step 850. The token is calculated as discussed above with respect to steps 510-550 of the flowchart of FIG. 5. Version information is added to the calculated token at step 860. As discussed above, the full token may include version information, a version identifier and a token string. When adding version information to the calculated token, both the version information and the version indicator may be added.

A cache prevention key may be generated at step 870. Generation of the cache prevention key may be performed as discussed above with respect to step 560 of the flowchart of FIG. 5. Next, the version, token and cache prevention key are combined or concatenated into a full token at step 880. Similar to step 570 in the flowchart of FIG. 5, combining the token and cache prevention key includes concatenating both character strings into one character string. The version information and version indicator are also included in the generated string. After the full token is generated, the token is packaged or otherwise inserted into a content response and the response is sent to a client device at step 890.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for receiving an authentication token, comprising:
   sending user information to a server;
   receiving an authentication token from the server, the authentication token received as part of content page code, the authentication token derived at least in part from the user information;
   displaying a web page at a client based on the content page code;
   receiving a user selection of an element in the web page, the element is associated with the authentication token; and
   sending a content request to the server in response to user input, wherein the sending the content request includes the content page code automatically including the authentication token in the content request in response to the user selection of the element.

2. The method of claim 1, wherein said step of receiving an authentication token includes:
   receiving an authentication token from a server in response to a request from a client device.

3. The method of claim 1, wherein said step of sending a content request includes:
   providing the authentication token in the content request as a requested URL parameter.

4. The method of claim 1, wherein said step of sending a content request includes:
   providing the authentication token in the content request as a form element parameter.

5. The method of claim 1, wherein the authentication token includes version information.

6. The method of claim 1, further comprising:
receiving a content response from the server in response to the content request, the content request including a second authentication token.

7. An apparatus for processing data, comprising:
a communication interface;
a storage device; and
one or more processors in communication with said storage device and said communication interface, said one or more processors perform a method comprising:
accessing user information;
generating a first authentication token based, at least in part, on the user information;
sending the first authentication token to a client device, the first authentication token provided in content page code, the content page code configured to store the first authentication token in a content page provided by a browser application, the content page code is configured to display the content page on the client device, the content page code is configured to automatically access the first authentication token upon user selection of an element in the content page that is associated with the first authentication token and to include the first authentication token in a content request from the client;
receiving a request authentication token from the client device in a content request, and
comparing the request authentication token to a master authentication token, the master authentication token matching the first authentication token.

8. The apparatus of claim 7, said one or more processors perform a method wherein said step of receiving a request authentication token includes:
receiving a request authentication token as a parameter in a requested URL.

9. The apparatus of claim 7, said one or more processors perform a method wherein said step of receiving a request authentication token includes:
receiving a request authentication token as a parameter in a form element.

10. The apparatus of claim 7, said one or more processors perform a method wherein said step of comparing the request authentication token includes:
detecting version information for the request authentication token.

11. The apparatus of claim 10, said one or more processors perform a method wherein said step of comparing the request authentication token includes:
selecting a master authentication token using the version information.

12. The apparatus of claim 7, said one or more processors perform a method further comprising:
sending a content response in response to the content request received with the request authentication token, the content response sent after determining the request authentication token matches the master authentication token.

13. The apparatus of claim 12, said one or more processors perform a method wherein said content response includes a second authentication token.

14. One or more processor readable storage devices having processor readable code embodied on said processor readable storage devices, said processor readable code for programming one or more processors to perform a method comprising:
accessing user information;
generating a first authentication token based, at least in part, on the user information;
transmitting said first authentication token to a client device, the first authentication token contained in code configured to load the first authentication token in a content page at a client, the code is configured to display the content page on the client device and automatically select the first authentication token upon user selection of a portion of the content page to include the first authentication token in a content request from the client;
receiving a request authentication token in a content request from the client; and
sending a content response to the client if the request authentication token corresponds to the first authentication token.

15. The one or more processor readable storage devices of claim 14, wherein said step of receiving a request authentication includes:
receiving a request authentication token as a parameter in a URL.

16. The one or more processor readable storage devices of claim 14, herein said step of receiving a request authentication includes:
receiving a request authentication token as a parameter in a form element.

17. The one or more processor readable storage devices of claim 14, herein said step of sending a content response includes:
generating a master authentication token which matches the first authentication token; and
determining the request authentication token matches the master authentication token.

* * * * *